United States Patent
Lee et al.

(10) Patent No.: US 7,231,543 B2
(45) Date of Patent: Jun. 12, 2007

(54) SYSTEMS AND METHODS FOR FAULT-TOLERANT PROCESSING WITH PROCESSOR REGROUPING BASED ON CONNECTIVITY CONDITIONS

(75) Inventors: Man-Ho Lawrence Lee, Milpitas, CA (US); Kousik Bera, Mumbai (IN); Marcelo Moraes De Azevedo, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 508 days.

(21) Appl. No.: 10/758,570

(22) Filed: Jan. 14, 2004

(65) Prior Publication Data
US 2005/0177766 A1   Aug. 11, 2005

(51) Int. Cl.
*G06F 11/00* (2006.01)
(52) U.S. Cl. .............................. 714/11; 714/43; 370/216
(58) Field of Classification Search .................. 714/11
See application file for complete search history.

(56) References Cited

U.S. PATENT DOCUMENTS

| | | | |
|---|---|---|---|
| 4,627,055 A * | 12/1986 | Mori et al. .................... 714/11 |
| 5,423,024 A * | 6/1995 | Cheung ......................... 714/11 |
| 5,592,610 A * | 1/1997 | Chittor ........................... 714/4 |
| 5,687,308 A | 11/1997 | Jardine et al. | |
| 5,884,018 A * | 3/1999 | Jardine et al. ................ 714/4 |
| 5,928,368 A | 7/1999 | Jardine et al. | |
| 5,991,518 A | 11/1999 | Jardine et al. | |
| 6,002,851 A | 12/1999 | Basavaiah et al. | |
| 6,195,754 B1 | 2/2001 | Jardine et al. | |
| 6,665,811 B1 | 12/2003 | de Azevedo et al. | |
| 7,099,942 B1 * | 8/2006 | Wilson et al. ............... 709/224 |
| 2002/0144175 A1 * | 10/2002 | Long et al. ................... 714/11 |
| 2005/0120259 A1 * | 6/2005 | Aoki .............................. 714/5 |
| 2006/0203717 A1 * | 9/2006 | Puppa et al. ................. 370/216 |

* cited by examiner

*Primary Examiner*—Scott Baderman
*Assistant Examiner*—Paul Contino

(57) ABSTRACT

Each processor in a distributed multi-processor environment maintains a set of connectivity condition scores. The connectivity condition scores are then passed to a pruning process with tie-breaker logic that selects certain of the processors to include in the new system configuration. The surviving processors are selected based on primary connectivity information and secondary processor connectivity condition scores. The result of the pruning/tie-breaker process is transmitted to all of the surviving processors, which continue to maintain connectivity information that can be used in the next regroup incident.

25 Claims, 9 Drawing Sheets

$CCS_t(Q,R) =$
$CCS_{t-1}(Q,R)*(1-d) + WSCE(Q,R)*d$

Connectivity Error Weight Table

| Error Type | Error Weight |
|---|---|
| Data Transfer Timeout | 1 |
| Barrier Timeout | 2 |
| . | . |
| . | . |

222

$$myFPCCS = \Sigma CCS_{t-1}(Q,R)$$ 224

SYSTEMS AND METHODS FOR FAULT-TOLERANT PROCESSING WITH PROCESSOR REGROUPING BASED ON CONNECTIVITY CONDITIONS

BACKGROUND

Vendors of fault-tolerant systems attempt to achieve both increased system availability, continuous processing, and correctness of data even in the presence of faults. Depending upon the particular system architecture, application software ("processes") running on the system either continue to run despite failures, or the processes are automatically restarted from a recent checkpoint when a fault is encountered. Some fault-tolerant systems are provided with sufficient component redundancy to be able to reconfigure around failed components, but processes running in the failed modules are lost. Vendors of commercial fault-tolerant systems have extended fault tolerance beyond the processors and disks. To make large improvements in reliability, all sources of failure must be addressed, including power supplies, fans and intercomponent links.

In some network architectures, multiple processor systems are designed to continue operation despite the failure of any single hardware component. Each processor system has its own memory that contains a copy of a message-based operating system. Each processor system controls one or more input/output (I/O) interconnect attachments, such as data communication busses. Dual-porting of I/O controllers and devices provides multiple communication paths to each device. External storage to the processor system, such as disk storage, may be mirrored to maintain redundant permanent data storage.

This redundancy is necessary in the network communication paths and components connecting end nodes, such that no path or component is critical to a connection. Typically, this redundancy is realized in the form of multiple switching fabrics on which a processor can communicate with another processor or peripheral component as long as at least one communication path to the other processor or peripheral component along a fabric is available and fully operative.

Also, application software (also referred to as "processes") may run under the operating system as "process-pairs" including a primary process and a backup process. The primary process runs on one of the multiple processors while the backup process runs on a different processor. The backup process is usually dormant, but periodically updates its state in response to checkpoint messages from the primary process. The content of a checkpoint message can take the form of a complete state update, or one that communicates only the changes from the previous checkpoint message.

To detect processor failures, each processor periodically broadcasts an "IamAlive" message for receipt by all the processors of the system, including itself, informing the other processors that the broadcasting processor is still functioning. When a processor fails, that failure will be announced and identified by the absence of the failed processor's periodic IamAlive message. In response, the operating system will direct the appropriate backup processes to begin primary execution from the last checkpoint. New backup processes may be started in another processor, or the process may run without a backup until the hardware has been repaired.

In addition to providing hardware fault tolerance, the processor pairs of the above-described architecture provide some measure of software fault tolerance. When a processor fails due to a software error, the backup processor frequently is able to successfully continue processing without encountering the same error.

When a time interval passes without receiving an IamAlive message from a given processor, the processor that detects the timeout can assume that the processor has failed, and informs other processors in the system of the fact. The other processors then ignore the content of messages from the failed processor. Ultimately, many or all of the other processors could end up ignoring the affected processor, and the ostracized processor functions outside of the system. This condition is sometimes called the split-brain problem as further described in U.S. Pat. No. 5,991,518, issued Nov. 23, 1999, entitled, "Method and Apparatus for Split-Brain Avoidance in a Multi-Processor System," naming as inventors Robert L. Jardine, Murali Basavaiah, and Karoor S. Krishnakumar.

Situations such as described in the preceding paragraph can cause both primary and backup processes running in the ostracized processor and in other processors in the system to regard themselves as the primary process, thereby destroying the ability to perform backup functions and possibly corrupting files and system tables. Further, all of the processors in a system can become trapped in infinite loops while contending for common resources. This problem can be avoided by supplementing the IamAlive mechanism with a regroup process as described in U.S. Pat. No. 5,884,018 entitled "Method And Apparatus For Distributed Agreement On Processor Membership In A Multi-Processor System". The regroup process determines a consensus among each processor's view of the state of all processors in the system, and the state of the connectivity among the processors. The regroup process ensures agreement among all processors on a set of surviving processors that are still communicatively coupled as a system. Conversely, processors that are not part of the surviving group selected by the regroup process cease their operations by halting.

SUMMARY

Embodiments of a method, system, and apparatus are disclosed that improve availability and fault tolerance in multi-processor systems. At least two candidate groups of processor units that are able to communicate with each other are formed. Connectivity condition scores (CCSs) for each candidate group of the processor units are evaluated, wherein each CCS indicates the severity of connectivity errors experienced by one communication path associated with the corresponding processor unit. One of the at least two candidate groups is selected based on the CCSs.

BRIEF DESCRIPTION OF THE FIGURES

Embodiments of the invention relating to both structure and method of operation, may best be understood by referring to the following description and accompanying drawings.

DETAILED DESCRIPTION

Figure 1:
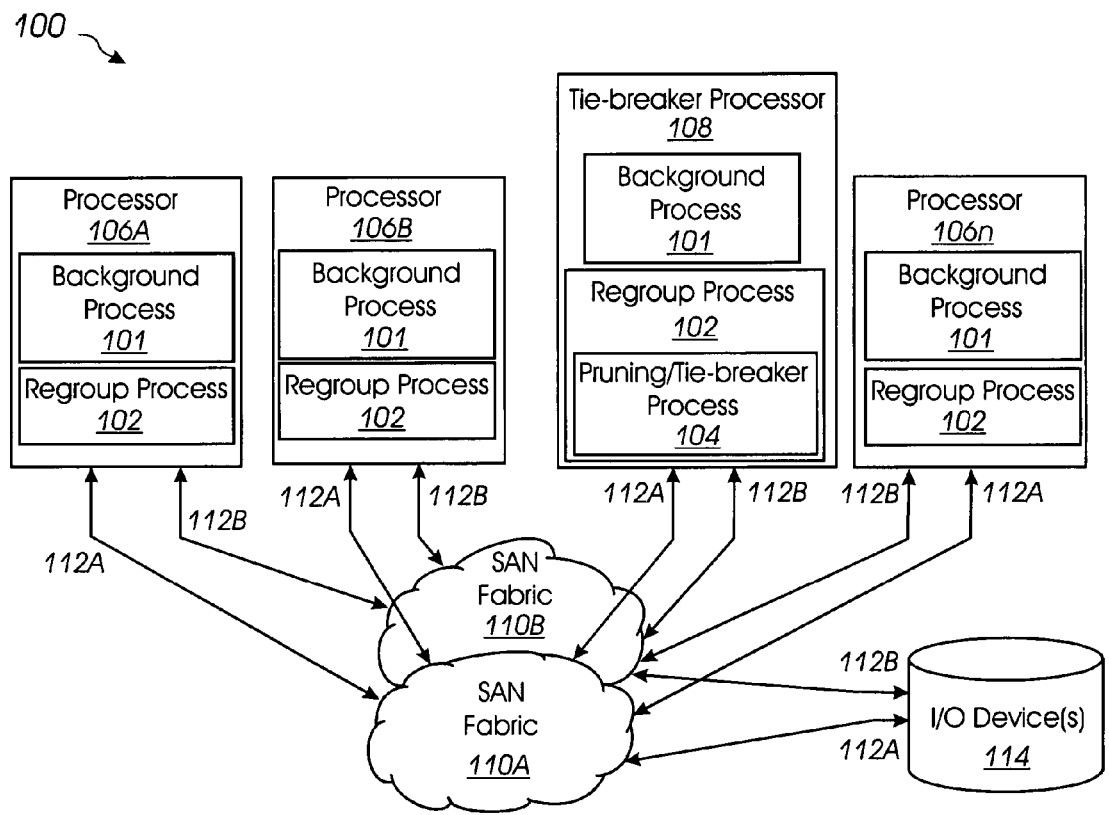
FIG. 1 shows an embodiment of a distributed processing system that can utilize a regroup process and an associated pruning/tie-breaker process to determine the group of surviving processors with maximal connectivity, and a background process to maintain connectivity condition scores at each processor.

Referring to FIG. 1, an embodiment of distributed processing system 100 is shown that can utilize background process 101, regroup process 102, and an associated pruning/tie-breaker process 104 to determine the group of processors 106A . . . n, 108 with maximal connectivity to include in system 100. Logical connectivity is defined as one or more full duplex communication paths to a processor 106A . . . n, 108. Previously known regroup processes have traditionally treated two processors communicating with each other using a single fabric to be the same as two processors that communicate with each other via multiple fabrics, such as described in U.S. Pat. No. 5,884,018 entitled "Method And Apparatus For Distributed Agreement On Processor Membership In A Multi-Processor System". In both of these situations, logical connectivity between the two processors existed, however, previously known regroup processes were unable to distinguish situations when only one fabric was supporting communication between the processors.

Moreover, previously known regroup processes did not consider connectivity error conditions when selecting a surviving group of maximally connected processors. Consequently, certain connectivity failure modes could cause previous regroup processes to prune out a healthy processor 106, 108 inadvertently instead of a failing processor 106, 108. A processor (e.g., processor 106A) may start detecting connectivity errors when communicating with another processor (e.g., processor 106B) due to early failure symptoms on processor 106B. If the connectivity errors are excessive, they can sever communications between processors 106A and 106B. Previous regroup processes could prune one of processors 106A and 106B to ensure that system 100 continues to function with a maximal group of communicatively coupled processors. Without considering connectivity error scores when selecting the surviving group of processors, previous regroup processes could prune out the healthy processor 106A. The problem processor (i.e., 106B in this example) could fail shortly after the regroup process completed. In this particular example, system 100 incurs a double processor failure, i.e., processor 106A is eliminated by the regroup process and processor 106B subsequently fails on its own due to an increasingly serious hardware failure, as opposed to the expected single failure of processor 106B.

If processors 106A and 106B are running the primary and backup processes of one or more process pairs, the double failure will cause these process pairs to cease operating. The double processor failure can therefore induce an application outage, or perhaps even cause a system outage (the latter is possible if processors 106A and 106B were running one or more process pairs providing access to critical system resources). Further, if the error symptoms exhibited by processor 106B continue to occur during an extended time interval before processor 106B finally stops on its own, additional regroup incidents may be triggered, possibly causing other healthy processors to be pruned out in a similar fashion as processor 106A. In the worst case, all healthy processors in system 100 may be pruned out by multiple regroup incidents, and system 100 is eventually reduced to the problem processor 106B.

In contrast to previously known regroup processes, embodiments of regroup process 102 disclosed herein determine the level of connectivity of each processor 106A . . . n, 108 in system 100. The connectivity levels can be used to distinguish whether a particular processor, for example processor 106A or 106B, is a more desirable choice to include in system 100.

Background process 101 and regroup process 102 are typically executed in each processor 106A . . . n, 108, while pruning/tie-breaker process 104 is typically executed only in tie-breaker processor 108. The results of pruning/tie-breaker process 104 can, however, be shared with the other processors 106A . . . n as described in U.S. Pat. No. 6,002,851 entitled "Method And Apparatus For Node Pruning A Multi-Processor System For Maximal, Full Connection During Recovery".

Processors 106, 108 can be interconnected by system area network (SAN) fabrics 110 (110A, 110B) and communication links 112 (112A, 112B) to enable communication between processors 106, 108. SAN fabrics 110 may include routing apparatus (not shown) and are configured to provide each processor 106, 108 with at least two communication paths to each of the other processors 106, 108 and to each of various I/O devices 114, such as printers, disk drives, tape drives, and the like. Components of system 100 can be implemented using suitable software, hardware, firmware, or a combination of software/hardware/firmware. Further, system 100 can be configured with components capable of wireless and/or wired communication.

Each processor 106, 108 typically implements an IamAlive message protocol for fault tolerance, and a prioritized interrupt system in which the sending of IamAlive messages is relegated to a low priority. Accordingly, each processor 106, 108 sends an IamAlive message to each of the other processors 106, 108 at regular intervals, and checks for receipt of IamAlive messages from the other processors 106, 108. When a processor 106, 108 fails to receive an IamAlive message from another processor 106, 108 after a specified period of time, the checking processor will initiate regroup process 102 to determine processors 106, 108 that continue to operate, and those that may have lost communication with the majority of the operating processors 106, 108.

In some embodiments, connectivity conditions of processors 106, 108 are ranked according to their number of operable paths, and only the processors 106, 108 with at least one operable path to itself and to other processors are included in system 100. The logical state of processors 106, 108 can be distinguished from the physical condition of processors 106, 108. The logical state of a processor 106, 108 can be up or down. A processors' 106, 108 physical condition, however, can be dead (which directly correlates to the down logical state), healthy (which directly correlates to the up logical state), malatose (as further described herein), or partially connected (as also further described herein).

Processor 106, 108 can be considered dead if it does not communicate with the rest of system 100. Situations that can result in processor 106, 108 being declared dead can include, for example, executing a HALT or a system freeze instruction; being stuck in an infinite loop with all interrupts disabled; executing non-terminating instructions due to data corruption; and being in a reset state. Some embodiments of regroup process 102 and pruning/tie-breaker process 104 remove dead processors 106, 108 from system 100. Other processors 106, 108 in system 100 can detect dead processors 106, 108 and declare them down.

Processor 106, 108 can be considered healthy if it exchanges packets with other processors 106, 108 within a reasonable time. Some embodiments of regroup process 102 prevent other processors 106, 108 in system 100 from declaring a healthy processor 106, 108 to be dead.

A processor 106, 108 in malatose condition is neither dead nor healthy. For example, a processor 106, 108 that does not respond in a timely manner, or is temporarily frozen in some low-level activity, can be considered malatose. Some embodiments of regroup process 102 and pruning/tie-breaker process 104 detect a malatose processor 106, 108 and force processor 106, 108 to become either healthy or dead. Correspondingly, a processor 106, 108 can halt itself when another processor 106, 108 that it has not declared down declares it down. Typically, the other processor 106, 108 informs the receiving processor 106, 108 that it has been declared down by sending a message referred to as a poison packet to that processor. The poison packet indicates that the processor is not part of the current system.

A processor 106, 108 is in a partially connected condition if it has lost all communication paths to at least one other processor 106, 108 and/or to itself. In this condition, two or more processors 106, 108 cannot exchange messages in both directions among themselves, and/or a processor 106, 108 cannot send messages to itself. Some embodiments of regroup process 102 and pruning/tie-breaker process 104 detect a partially connected processor 106, 108 and force partially connected processors 106, 108 to become either healthy or dead. Typically, pruning/tie-breaker process 104 will select a set of healthy processors 106, 108 that are fully communicatively coupled to survive the regroup incident, and will force one or more partially connected processors 106, 108 to halt.

In some embodiments, processor units 106, 108 can be implemented in any suitable computing device, and so include modular or rack-mounted processor units, personal data assistants (PDAs), network appliances, desktop computers, laptop computers, X-window terminals, or other such devices that include processing facilities and are configurable to communicate among themselves in system 100. In some embodiments, components in system 100 can communicate with other external networks via suitable interface links such as any one or combination of T1, ISDN, cable line, a wireless connection through a cellular or satellite network, or a local data transport system such as Ethernet or token ring over a local area network. Any suitable communication protocol, such as Hypertext Transfer Protocol (HTTP) or Transfer Control Protocol/Internet Protocol (TCP/IP), can be utilized to communicate with other components in external networks.

Figure 2A:
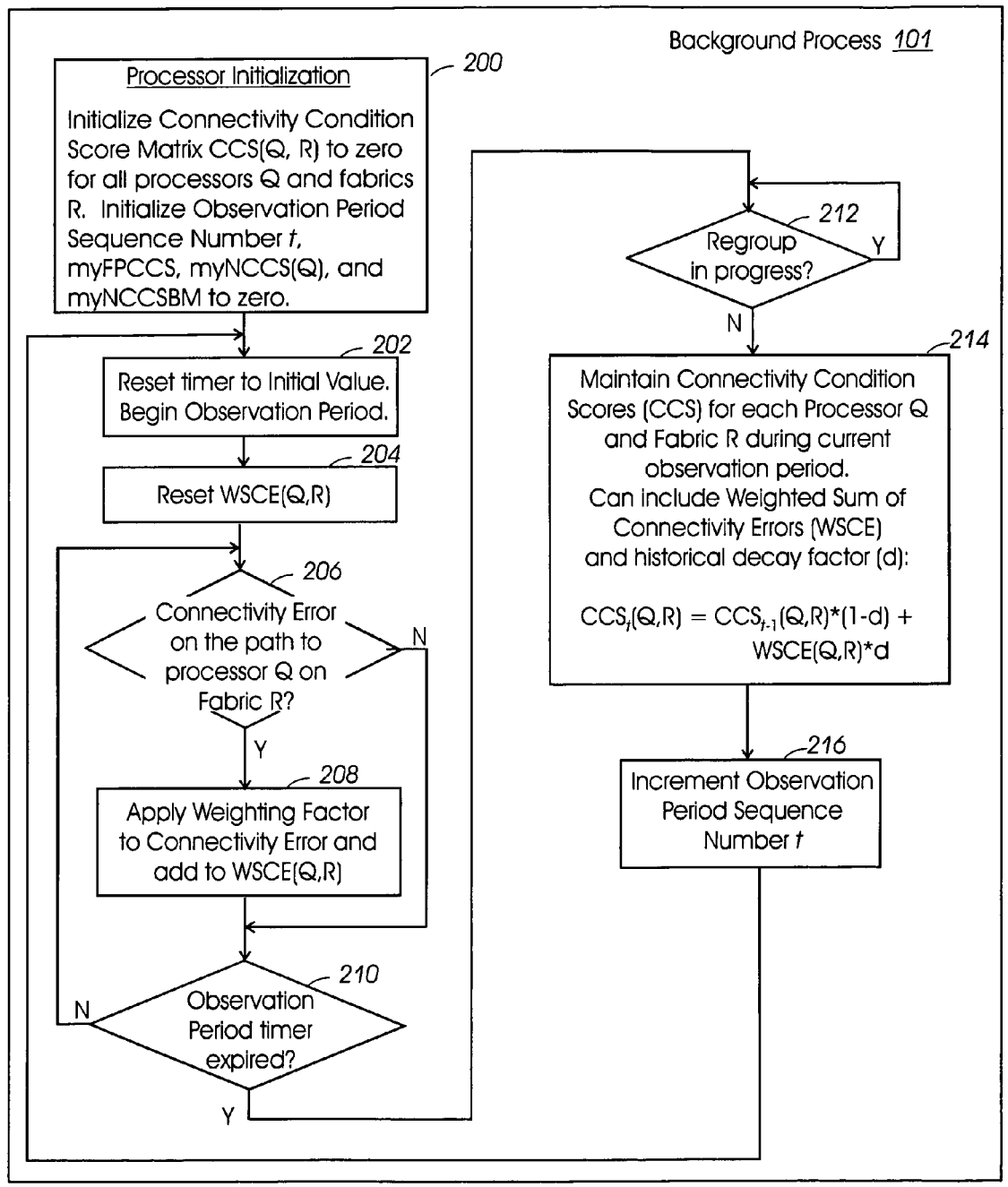
FIG. 2A shows a flow diagram of processes that can be included in some embodiments of a background process that can be utilized to maintain a score of each processor's connectivity condition in the distributed processing system of FIG. 1.
Figure 2B:
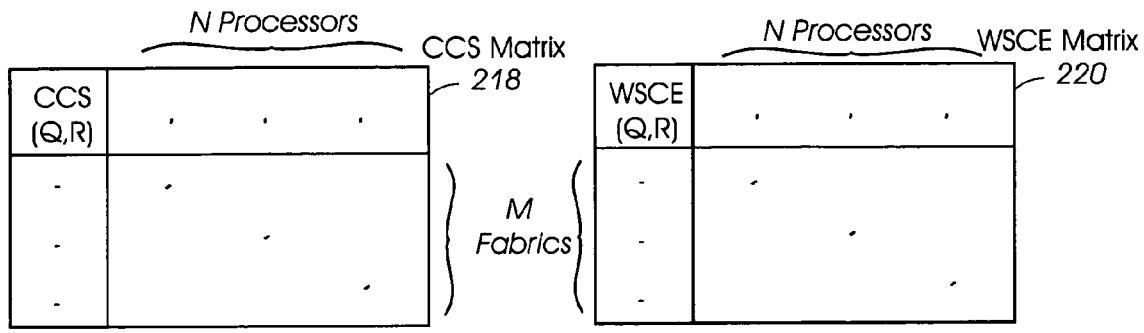
FIG. 2B shows a diagram of examples of data structures that can be included in the background process of FIG. 2A.
Figure 2B:
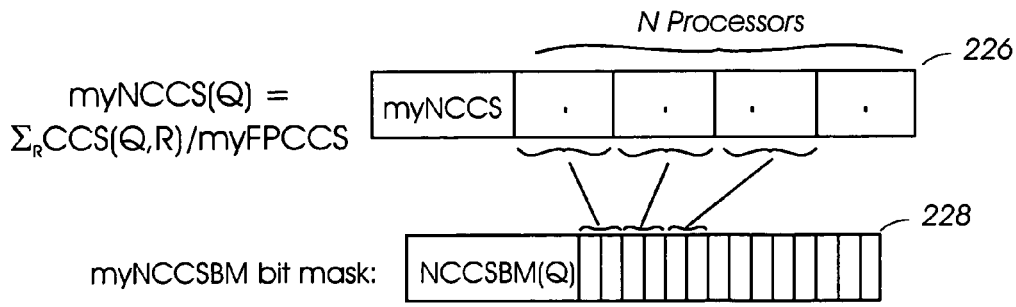

Referring now to FIGS. 1, 2A, and 2B, FIG. 2A shows a flow diagram of processes 200-216 that can be included in some embodiments of background process 101 to maintain information regarding each processor's connectivity condition. FIG. 2B shows examples of data structures 218-228 related to a processor's connectivity condition that can be utilized in background process 101 and regroup process 102. Background process 101 can be executed during the operation of its respective processor 106, 108, independently of regroup process 102.

As shown in FIG. 2B, each processor 106, 108 can maintain a Connectivity Condition Score (CCS) matrix 218 to represent the processor's connectivity condition to itself and to other processors 106, 108 within system 100 along each particular fabric 110. If there are N processors in system 100 and there are M different fabrics 110 connecting these processors, N*M different CCSs can be maintained by each processor 106, 108. The CCS maintained by processor 106, 108 for its communication path to processor Q via fabric R is referred to as CCS(Q,R) and can be determined based on the current connectivity errors encountered with the communication path. For each connectivity condition score, the processor 106, 108 maintains a Weighted Sum of Connectivity Errors (WCSE), which the corresponding path accumulates in the current observation period. Typically, processor 106, 108 stores WCSE values for N*M paths in WCSE matrix 220.

There are certain types of transient errors that can occur on a path in system 100. Background process 101 can utilize Connectivity Error Weight Table 222 that includes an associated weight for each type of error. For example, data transfer timeouts and barrier packet timeouts are recoverable non-fatal errors that often will not disrupt communications along the path, unless such errors are occurring at an excessive rate. Conversely, if such errors are excessive, processor 106, 108 may transition the path from an operational state to a down state, and refrain from using the path for further communications until the component causing the errors (e.g., a failing link 112 or a component in SAN fabric 110) has been repaired. Data transfer timeouts can occur when processor 106, 108 does not acknowledge receipt of a data packet or message within a predetermined period of time. Barrier packet timeouts can occur when processor 106, 108 sends a control packet to test whether a path is viable and clear of previously transmitted packets before transmitting additional packets. Barrier packets are typically allowed a longer timeout interval than a regular data packet. Thus, a barrier packet timeout can be considered more severe than a data packet timeout. In one embodiment, the Connectivity Error Weight for data transfer timeouts is one, while barrier packet timeouts have a Connectivity Error Weight of two, as indicated in the example of a Connectivity Error Weight Table 222 shown in FIG. 2B. Other types of connectivity errors can be weighted in addition to, or instead of data packet and/or barrier packet timeouts.

The ratios of the weights in the Connectivity Error Weight Table 222 can indicate the relative importance of the connectivity errors with respect to each other. The weights can be multiplied with the magnitude of the errors, typically in terms of an error count. The higher the value of a weight, the more influential a unit of such error can be to the corresponding CCS. In one embodiment, errors are processed individually, and the corresponding weight value is added to the WSCE in WSCE matrix 220 each time an error is received on the associated path. Other suitable weighting methods can be utilized for various types of connectivity errors.

Referring also to FIG. 2A, each processor 106, 108 initializes data structures 218-228 during its cold load or reload. For example, the CCS(Q,R) matrix 218 and observation period sequence number t can be initialized to zero, and Connectivity Error Weight Table 222 can be initialized with appropriate values, in process 200. Other data structures such as From Processor CCS (myFPCCS) 224, Normalized CCS array (myNCCS(Q)) 226, and NCCS bit mask (myNCCSBM) 228, as further described herein, can also be initialized to zero in process 200. If the processor is the tie-breaker processor 108, additional data structures can be initialized as further described herein. Some data structures, such as the WSCE matrix 220 and observation period timer can be initialized each time a new observation period begins, as indicated by processes 202 and 204.

Background process 101 monitors connectivity errors until the observation period expires. If a connectivity error corresponding to a path to processor Q on fabric R is detected in process 206, the weight corresponding to such connectivity error can be retrieved from a Connectivity Error Weight Table 222, and multiplied by the magnitude of the error. The weighted error can be added to the Weighted Sum of Connectivity Errors (WSCE) corresponding to the path to processor Q on fabric R, as indicated by process 208.

An observation period is generally a fixed time duration in which the WSCEs are accumulated starting at zero. Another observation period begins when the current observation period expires. The first observation period can be started when the first path is initialized. In one embodiment, a timer starts at a predetermined value and decrements a specified amount upon receiving a timer interrupt. The observation period can be defined by the number of interrupts issued at specified intervals. For example, an observation period of 38.4 seconds is equivalent to 128 timer interrupts issued at every 0.3 second intervals. In this example, the initial value of such timer is 128. Other suitable mechanisms for timing an observation period can be utilized.

When process 210 detects that the current observation period has expired, process 212 determines whether a regroup incident is currently in progress. If a regroup incident is currently in progress, process 212 waits until the current regroup incident is finished. Otherwise, background process 101 transitions to process 214 to maintain the CCS for each path to processor Q on fabric R. In some embodiments, the Connectivity Condition Score (CCS) for the path to processor Q on fabric R at observation period t can be determined as follows:

$$CCS_t(Q,R) = CCS_{t-1}(Q,R)*(1-d) + WSCE(Q,R)*d$$

Where d is a decay factor, ranging from 0 to 1, that can be applied to historical Connectivity Condition Scores; and WSCE(Q, R) is the weighted sum of connectivity errors for path to processor Q on fabric R. The CCS values are generally stored in a two-dimensional CCS(Q,R) matrix 218, however, other suitable data structures can be utilized. In some embodiments, the value of index Q can range from zero to the total number of processors 106, 108 that can be included in system 100 minus one (i.e., N−1). The value of index R can range from zero to the total number of switching fabrics 110 that can be included in system 100 minus one (i.e., M−1). Other suitable values for indices Q and R can be utilized, as well as other data structures for storing indicators of a processor's connectivity condition to itself and to other processors 106, 108 via fabrics 110.

When historical Connectivity Condition Scores are used to determine the current CCS, more recent connectivity scores can be considered more relevant than older connectivity scores. The decay factor d defines how fast the historic scores are decayed over an observation period. In one embodiment, the decay factor d has a value of 0.5, however, any suitable value for the decay factor can be utilized.

Once all new CCSs are calculated, process 216 increments the observation period sequence number (t), and returns to the beginning of process 202 to start a new observation period.

Figure 2C:
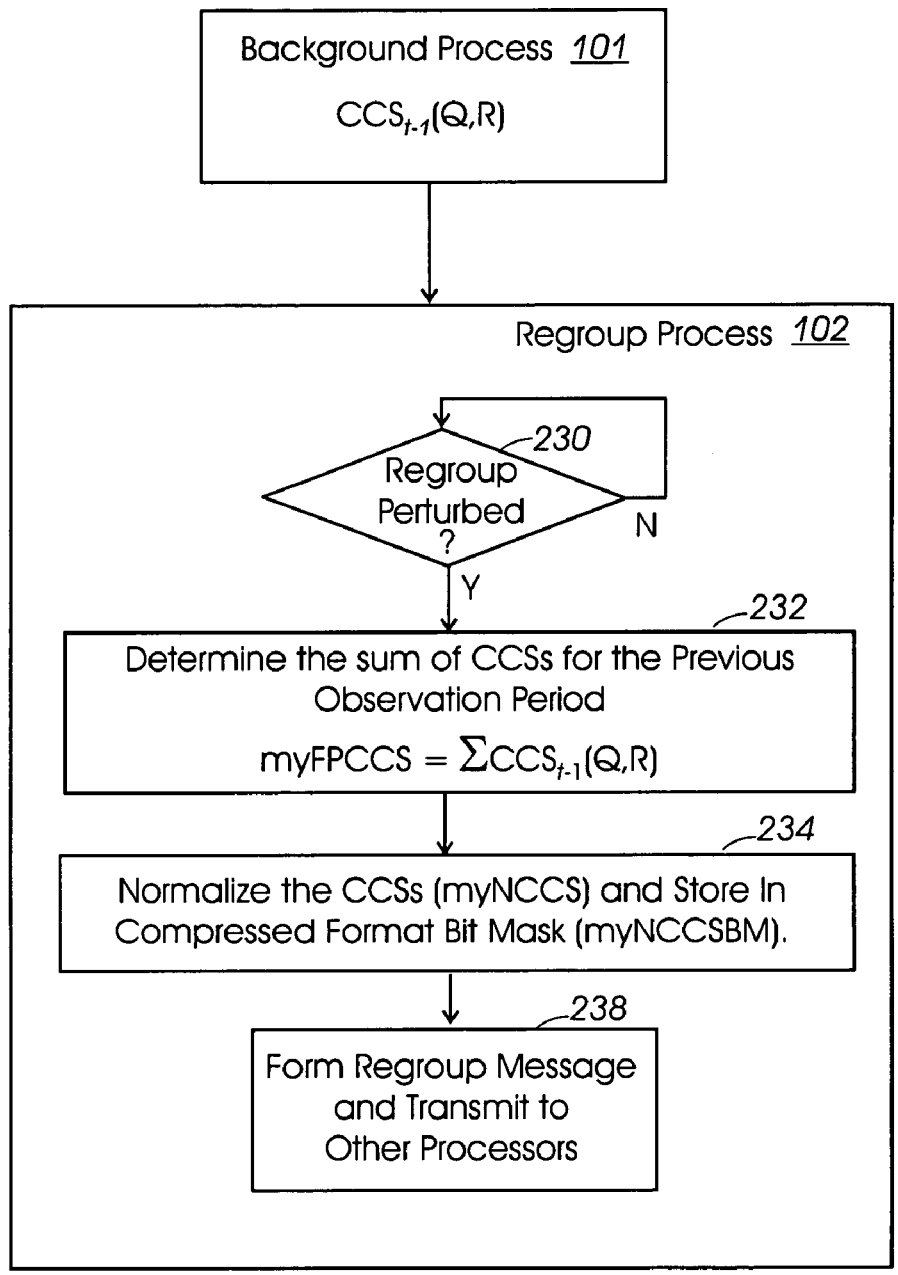
FIG. 2C shows a flow diagram of functions that can be performed in some embodiments of a regroup process that can be utilized in the distributed processing system of FIG. 1.

Referring now to FIGS. 1, 2B, and 2C, regroup process 102 can be invoked when any of processors 106, 108 in system 100 become perturbed. A processor 106, 108 can become perturbed under various conditions, such as (1) the processor failed to receive an IamAlive message from itself or from another processor within a specified amount of time, as taught for example in U.S. Pat. No. 5,884,018, "Method And Apparatus For Distributed Agreement On Processor Membership In A Multi-Processor System"; (2) the processor detects that system 100 is recovering from a power outage, as taught for example in U.S. Pat. No. 6,195,754, "Method And Apparatus For Tolerating Power Outages Of Variable Duration In A Multi-Processor System"; or (3) the processor loses all communication paths to a processor, as taught for example in U.S. Pat. No. 6,665,811, "Method And Apparatus For Checking Communicative Connectivity Between Processor Units Of A Distributed System".

FIG. 2C shows a flow diagram of processes that can be included in some embodiments of regroup process 102 to form and transmit each processor's connectivity condition scores to other processors in system 100 when a regroup incident occurs, as determined by process 230. In some systems, the amount of information that can be exchanged between processors in a single regroup message is very limited in size. For example, a typical implementation will send regroup messages via a higher priority mechanism than other messages, and such mechanism often imposes limits on high-priority transfer sizes. Accordingly, the CCS matrix 218 for each processor 106, 108 can be summarized in a single score, referred to herein as the "From Processor Connectivity Condition Score" (myFPCCS) 224, as indicated in FIG. 2B. In some embodiments, myFPCCS represents the sum of Connectivity Condition Scores of all paths that originate from the processor 106, 108 during the previous observation period (t−1), as determined in process 232 in FIG. 2C using the following formula, for example:

$$myFPCCS = \Sigma CCS_{t-1}(Q,R)$$

where $CCS_{t-1}(Q,R)$ is the Connectivity Condition Score of the path from the processor performing regroup process 102, to processor Q on fabric R in the previous observation period (t−1).

The parameter myFPCCS 224 provides an aggregate measure of connectivity errors incurred by the processor 106, 108 when sending data to other processors 106, 108 and to itself. For example, in some implementations, one can expect a large myFPCCS score if the processor's ability to send messages to other processors 106, 108 and to itself along one or more fabrics 110 has been affected by one or more connectivity failures located close to the sending processor. The parameter myFPCCS 224 can be utilized in connection with Normalized values of the Connectivity Condition Scores (myNCCSs), in which a limited number of bits are used to represent each CCS. Processor 106, 108 can store myNCCS values in myNCCS array 226. The myNCCS array 226 can be formatted into a bit mask in process 234, shown as myNCCSBM(Q) 228 in FIG. 2B, to minimize the amount of data that is transmitted to tie-breaker processor 108.

Figure 2D:
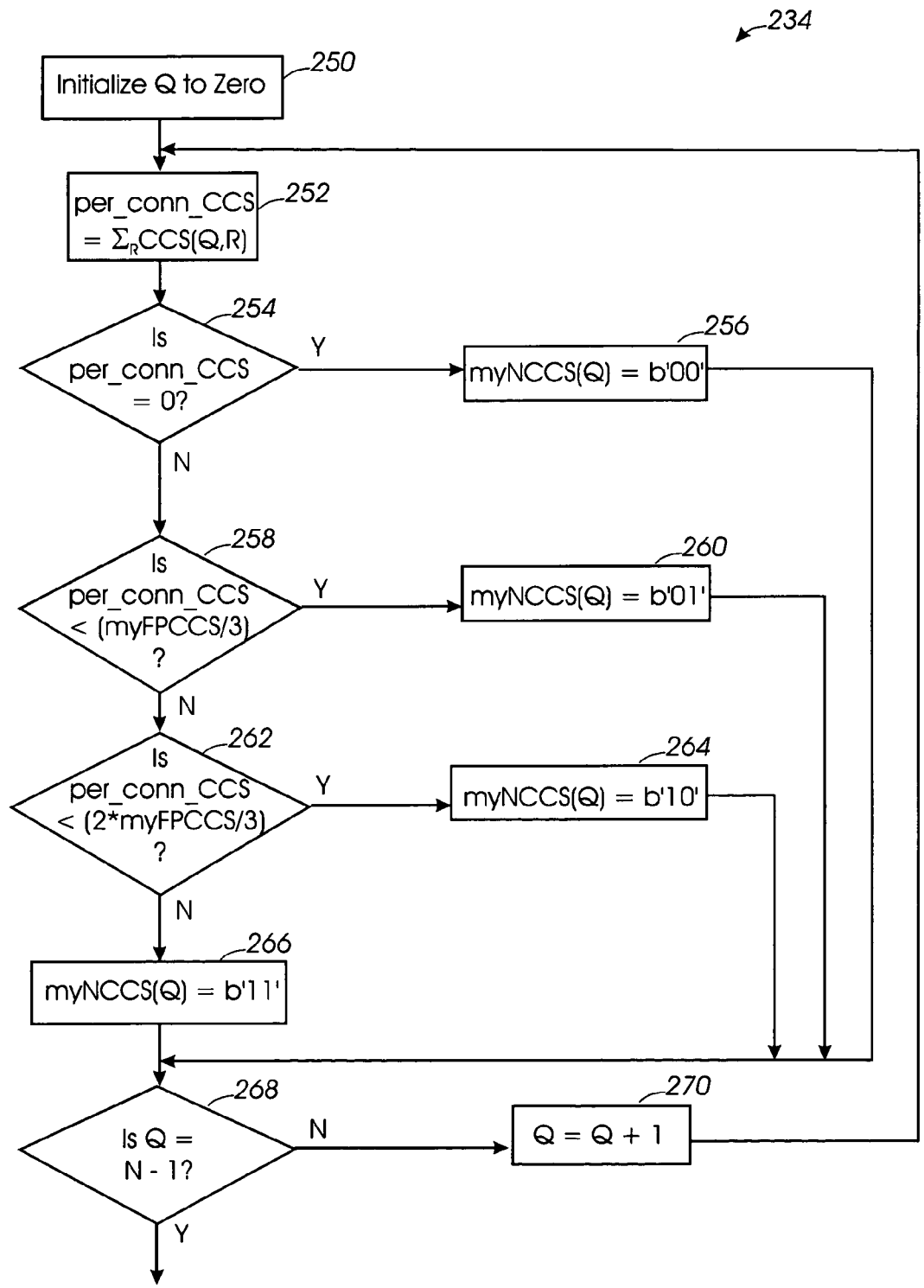
FIG. 2D shows a flow diagram of an embodiment of a process to normalize connectivity condition scores that can be included in some embodiments of the regroup process of FIG. 2C.

FIG. 2D shows a flow diagram of an embodiment of process 234 to normalize the CCSs. In the embodiment shown, each element of the myNCCS array 226 uses two bits to represent the sum of the Connectivity Condition Scores of all paths to a particular processor 106, 108. The number of bits allocated to represent the sum of the CCS scores for a processor 106, 108 can be varied depending on the number of processors 106, 108 and fabrics 110 in system 100, and on the number of bits available to convey the normalized CCS scores in regroup messages.

In the embodiment shown, the local loop variable Q is initialized to zero in process 250. This local variable Q is used to loop through all elements of a corresponding row of CCS matrix 218 and myNCCS array 226. Once this local variable Q is initialized, the execution flow assigns values to each element of myNCCS array 226 based on the values of the corresponding CCS matrix elements relative to the value of myFPCCS 224 of the processor 106, 108 executing process 234.

In process 252, the values of CSSs for paths to processor Q along all fabrics 110 are summed together and stored in a variable, such as per_conn_CCS. In one embodiment, there are two paths to processor Q (i.e., one path along each one of two fabrics 110), therefore process 252 sums CCS(Q, 0) and CCS(Q, 1) to form per_conn_CCS. Processes 254, 258 and 262 examine the value of the per_conn_CCS, and branch to process 256, 260, 264 or 266 according to the value of the per_conn_CCS. For example, in process 254, if the value of the examined per_conn_CCS is zero, the logic transitions to process 256 to set the corresponding element of myNCCS array 226 to a value of binary '00'. Otherwise, the logic transitions to process 258 to determine whether the value of per_conn_CCS is less than one third of the processor's myFPCCS 224. If so, the logic transitions to process 260 to set the corresponding element of myNCCS array 226 to a value of binary '01'. Otherwise, the logic transitions to process 262 to check for other possibilities. In process 262, if the value of the examined per_conn_CCS is less than two thirds of the processor's myFPCCS value, the logic transitions to process 264 to set the corresponding element of myNCCS array 226 to a value of binary '10'. Otherwise, the logic transitions to process 266 to set the corresponding element of myNCCS array 226 to a value of binary '11'. Note that process 234 can be adapted to accommodate variations in the number of bits used to represent values in the myNCCS array 226.

Once the value of the corresponding element in the myNCCS array 226 has been set, process 268 determines whether all of the CCSs have been normalized, i.e, whether Q has a value of N−1. In such case, control returns to the calling regroup process 102. Otherwise, process 270 increments the myNCCS array index (Q), and processes 252 through 270 are repeated until all CCSs have been processed.

Referring again to process 234 in FIG. 2C, the elements of the myNCCS array 226 can be combined in a bit mask, referred to as a Normalized CCS Bit Mask (myNCCSBM) 228, to store the CSSs in compressed format. For example, in one embodiment, system 100 can potentially include sixteen processors 106, 108. Each value of the myNCCS array 226 occupies two bits, which are combined to form a 32-bit mask, myNCCSBM 228. Both myNCCSBM 228 and myFPCCS 224 are sent to tie-breaker processor 108 during a regroup incident. Pruning/tie-breaker process 104 can approximate the original CCS values by unpacking the appropriate bits for each CCS from myNCCSBM 228, and scaling each set of CCS bits using myFPCCS 224. In other implementations where data transfer restrictions for regroup process 102 are not as limited, the CCSs can be sent to the tie-breaker processor in one or more packets, thereby eliminating the need to generate and send myNCCSBM 228 and myFPCCS 224.

In process 238, a perturbed processor 106, 108 forms a regroup message and transmits the regroup message to all processors 106, 108 in system 100. As described herein, pruning/tie-breaker process 104 (FIG. 1) evaluates the information in the regroup messages, and transmits the new system configuration to all of the processors 106, 108. Processors 106, 108 that are not included in the new system configuration unconditionally halt. In some embodiments, the regroup message can include the information shown in Table 1:

TABLE 1

| Regroup Message Fields | | |
|---|---|---|
| Packet subtype | Stage | Regroup reason |
| Regroup sequence number | | myFPCCS |
| Activating processor | Causing processor | Powerfail |
| | Knownstage1 | Knownstage2 |
| | Knownstage3 | Knownstage4 |
| | Knownstage5 | Pruning_result |
| | Connectivity matrix | |
| | myNCCSBM | |

Where:
Packet subtype identifies the type of information in the packet, such as regroup information;
Stage identifies the regroup process stage, as described in the discussion of FIGS. 3A and 3B herein;
Regroup reason identifies the type of error that caused a processor 106, 108 to become perturbed and initiate the current regroup incident, such as missing IamAlive messages from a processor, a system recovery from a power outage, or loss of all communication paths to a processor 106, 108;
Regroup Sequence Number identifies the current regroup incident and can be used to synchronize all processors 106, 108 for a particular regroup incident;
myFPCCS is a value representing the sum of all connectivity condition scores maintained by background process 101 during the last observation period before one of processors 106, 108 became perturbed;
Activating processor identifies the first processor that instigated the current regroup incident;
Causing processor identifies the processor that perturbed the Activating processor in the current regroup incident;
Powerfail identifies the processor numbers of all processors that underwent a power outage and are currently recovering from that power outage;
Knownstage 1 through 5 identify the numbers of all processors 106, 108 known to the maintaining processor to be participating in a regroup incident in the stage corresponding to the Knownstage variable;
Pruning_result identifies the processor numbers of all processors 106, 108 that are included in system 100 after the regroup incident;

Connectivity matrix includes information regarding the state of the communication paths between all processors 106, 108 in system 100; and myNCCSBM is the Normalized CCS Bit Mask.

The connectivity matrix (CM) is generally an N by N matrix, where N is the number of processors 106, 108 in system 100. In one embodiment, each entry in the matrix is a bit, and each processor is assigned a unique number between 0 and N−1. Bit values of TRUE or FALSE are used in CM(i,j) to indicate the ability of processor (i) to receive a message from processors). In one embodiment, the connectivity matrix in a regroup message is logically OR-ed with an N by N matrix that a processor receiving the regroup message maintains. In addition, when a processor (i) receives a regroup message from a processor (j), the processor (i) sets the CM(i,j) entry of its connectivity matrix to TRUE, indicating that the processor (i) can receive messages from processor (j). Two entries exist for the pair of processors i and j: CM(i,j) and C(j,i). This dual-entry system allows the multi-processor system to detect failures that break symmetry, i.e., processor i can receive from processor j but processor j cannot receive from processor i.

Any suitable format for the fields in the regroup message can be utilized. Additionally, different ways of communicating regroup information among the processors can be utilized, such as shared memory among the processors, in addition to, or instead of, transmitting messages. Further, a regroup message can include additional, or fewer, fields with the same and/or different information than shown in the example above. Some of the fields in the regroup message can be formatted as bit masks to represent multiple pieces of information in a condensed format. For example, myNCCSBM can be a 32-bit mask, with 16 pairs of bits that represent the connectivity score for each processor. As another example, the Pruning_result field can also have a bit structure indicating which processors of a multiprocessor system survive pruning/tie-breaker process 104.

Figure 2E:
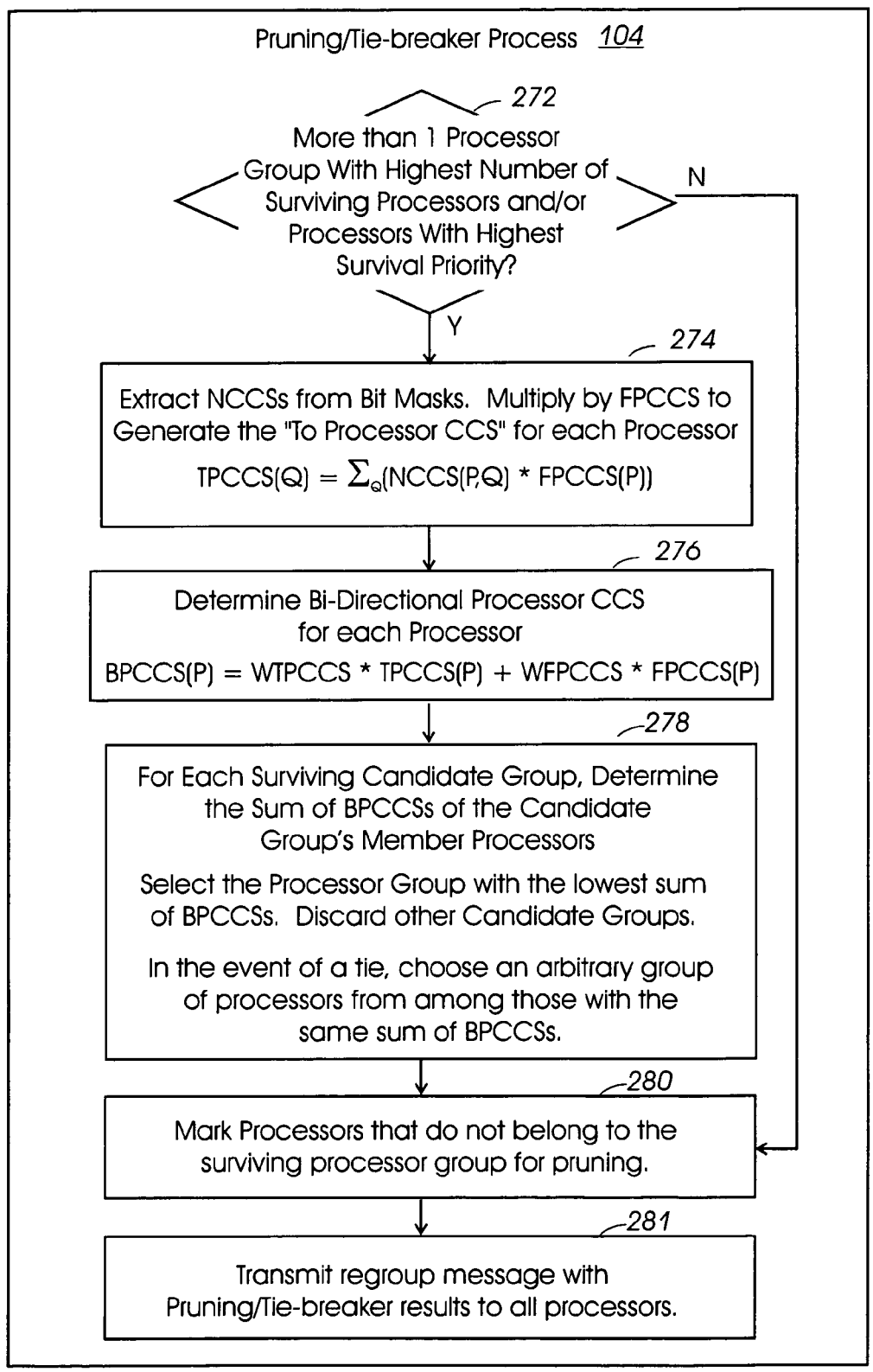
FIG. 2E shows a flow diagram of an embodiment of a pruning/tie-breaker process that can be included in some embodiments of the regroup process of FIG. 2C.
Figure 2F:
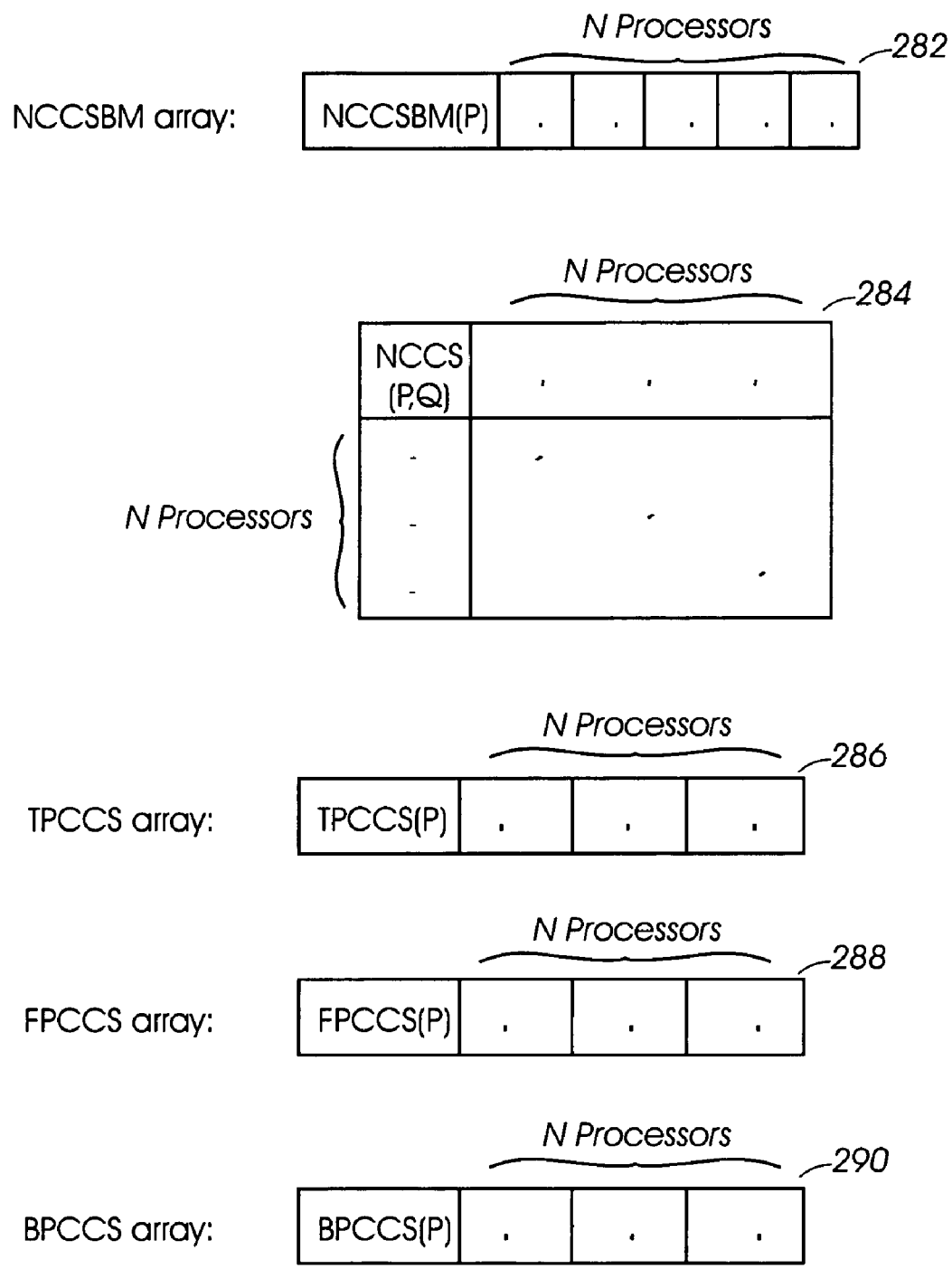
FIG. 2F shows a diagram of examples of data structures that can be included in some embodiments of the pruning/tie-breaker process of FIG. 2E.

Referring now to FIGS. 1, 2E, and 2F, FIG. 2E shows a flow diagram of processes 272-281 that can be performed by some embodiments of pruning/tie-breaker process 104. In some embodiments, tie-breaker processor 108 maintains data structures such as data structures 282-290 shown in FIG. 2F, to store information received from the regroup messages sent by each processor 106, 108. The data structures 282-290 can be initialized at the beginning of each regroup incident, before the most current connectivity information is transmitted to tie-breaker processor 108 from processors 106, 108 in system 100.

In FIG. 2E, process 272 determines whether there is more than one processor group with the highest number of surviving processors 106, 108. A partially connected group of processors 106, 108 can be viewed as a fully connected group to which a set of disconnects has been applied. To compute the set of all maximal, fully connected subgroups of processors 106, 108, process 272 makes a list of the disconnects in the connectivity matrix CM(i,j) as taught, for example, in U.S. Pat. No. 6,002,851 entitled "Method And Apparatus For Node Pruning A Multi-Processor System For Maximal, Full Connection During Recovery". Process 272 generates an initial solution set of a fully connected group with all the processors 106, 108, and can improve the solution set by applying the disconnects one by one. In one embodiment, process 272 can include:

1. Compute the set of all dead processors, that is, the set of all processors i such that CM(i,i) is FALSE.

2. Convert the connectivity matrix into canonical form by removing rows and columns corresponding to dead processors.
3. Compute the set of all disconnects, which is the set of pairs (i,j) such that C(i,i) is TRUE, C(j,j) is TRUE (that is, processors i and j are alive) and C(i,j) is FALSE.
4. The variable "Groups" is the solution array and the variable "NumGroups" is the number of entries in the solution array. Start with an initial solution that contains one group that is equal to the set of live processors.

Groups:=live.processors; /* Groups is an array of SETs*/

NumGroups:=1; /* number of elements in the array*/

All live processors are initially assumed to be fully connected. Each disconnect is applied in turn, breaking the groups in the array into fully connected subgroups.
5. Process each disconnect by applying it to the current elements in "Groups". Applying a disconnect (i,j) to a group of processors that does not contain processor i or j has no effect. Applying the disconnect (i,j) to a group that contains both processors i and j splits the group into two fully connected subgroups, one the same as the original with processor i removed and the other the same as the original with processor j removed.

When a group thus splits into two subgroups, process 272 examines each of the new subgroups to see whether it already exists or is a subset of an already existing group. Only new and maximal subgroups are added to the array of groups. "NumGroups" becomes the number of maximal, fully connected subgroups, and "Groups" contain these subgroups. From the set of subgroups thus found, one group survives. If all processors 106, 108 are treated the same, the best candidate for survival can be defined as the one with the greatest number of processors 106, 108. In case of a tie, an arbitrary subgroup can be selected.

In some embodiments, processors 106, 108 have different survival priorities based on the kinds of services each provides. For instance, processors 106, 108 that have a primary or backup process providing a system-wide service can have a higher survival priority. As another example, the lowest-numbered processor 106, 108 can have the highest survival priority as the tie-breaker processor 108.

If there is more than one processor group with the highest number of surviving processors 106, 108 and/or processors 106, 108 with the highest survival priority, the "To Processor CCS" can be determined for each processor 106, 108 in process 274. If the CCSs have been normalized and stored in myNCCSBM 228 (FIG. 2B), tie-breaker processor 108 stores myNCCSBM bit masks 228 received from processors 106, 108 in NCCSBM array 282. Process 274 extracts related myNCCSs 226 from the corresponding element in NCCSBM array 282 received from one of processors 106, 108, and stores the NCCS values in NCCS matrix 284, shown in FIG. 2F. To unpack each element of NCCSBM array 282, the rightmost set of bits corresponding to the lowest numbered processor 106, 108 are stored in an element of NCCS matrix 284. The value of the element of NCCSBM array 282 is then right shifted the corresponding number of bits to access the bits for the next processor and stored in an element of NCCS matrix 284. This bit unpacking procedure is repeated until the bits for each processor 106, 108 have been stored in the corresponding elements of the NCCS matrix 284. The next element of NCCSBM array 282 can then be unpacked into the next corresponding elements of NCCS matrix 284.

NCCS matrix 284 can be used to form an array that includes each processor's To Processor Connectivity Condition Score (TPCCS) 286. TPCCS 286 for processor P provides an aggregate measure of connectivity errors incurred by all processors 106, 108 when sending to processor P. For example, one can expect a large TPCCS 286 for a processor 106, 108 if the processor's ability to receive messages from other processors 106, 108 via one or more fabrics 110 has been affected by one or more connectivity failures located close to the receiving processor 106, 108. In some embodiments, TPCCS 286 can be determined for each processor P as follows:

$$TPCCS(P) = \Sigma_{Q:(0,N-1)}(NCCS(P,Q)*FPCCS(Q))$$

Pruning/tie-breaker process 104 can also determine a Bidirectional Processor Connectivity Condition Score (BPCCS) 290 for each processor 106, 108 based on the processor's corresponding FPCCS 288 and TPCCS 286, as indicated by process 276. The BPCCS 290 for processor P provides an aggregate measure of connectivity errors incurred in messages sent by processor P to processors 106, 108, plus connectivity errors incurred in messages sent by processors 106, 108 to processor P. The BPCCS 290 can influence the selection of processors 106, 108 that will be included in system 100 at the end of a regroup incident. The BPCCS 290 of a given processor P can be determined, for example, as follows:

$$BPCCS(P) = WTPCCS*TPCCS(P) + WFPCCS*FPCCS(P)$$

where WTPCCS and WFPCCS are weighting factors for TPCCS 286 and FPCCS 288, respectively. The values of WTPCCS and WFPCCS for a particular implementation can be determined based on how influential TPCCS 286 and FPCCS 288 for each processor 106, 108 are to pruning/tie-breaker process 104. In some embodiments, both WTPCCS and WFPCCS have a value of one, indicating that TPCCS 286 and FPCCS 288 are equally important. In other embodiments, values of WTPCCS and WFPCCS can be set to weight either TPCCS 286 or FPCCS 288 more heavily. Once the BPCCSs 290 of all processors participating in regroup process 102 have been determined, the sum of BPCCSs 290 of the surviving candidate groups' processors are determined.

When there is more than one fully communicatively coupled processor group with the highest number of processors and/or processors with the highest survival priority, a group with fully operative processors 106, 108 is selected over a group with one or more processors that have a history of connectivity problems. Accordingly, process 278 compares the sum of BPCCSs 290 of the candidate groups' processors, and selects the processor group with the lowest sum of BPCCSs 290. If more than one group has the lowest sum of BPCCSs 290, an arbitrary group among those with the lowest BPCCSs 290 can be selected.

Process 280 includes setting indicators, such as flags or other variables, to inform the processors 106, 108 in system 100 of the resulting configuration. For example, the bit mask Pruning_Result in the regroup message (Table 1) can be used to indicate the processors 106, 108 that are and are not included in system 100. Process 281 transmits the regroup message to all processors 106, 108 in system 100. Any processors that are not included in the new configuration of system 100 will halt and cease operations when they receive the pruning result.

In some embodiments, regroup process 102 in each processor 106, 108 passes through Stage 0, Stage 6, and Stages 1 through 5. Stage 6 corresponds to the stable state. Processors 106, 108 spend most of their time stable. While a processor 106, 108 is stable, it knows that every processor 106, 108 in the current system 100 is up and every processor not in the current system 100 is down. Each processor 106, 108 in the current system 100 configuration has the same regroup sequence number. A regroup incident begins when a processor 106, 108 becomes perturbed and ends when all processors 106, 108 become stable again. Each regroup incident has a sequence number that typically corresponds to the number of regroup incidents since system 100 was initialized.

Figure 3A:
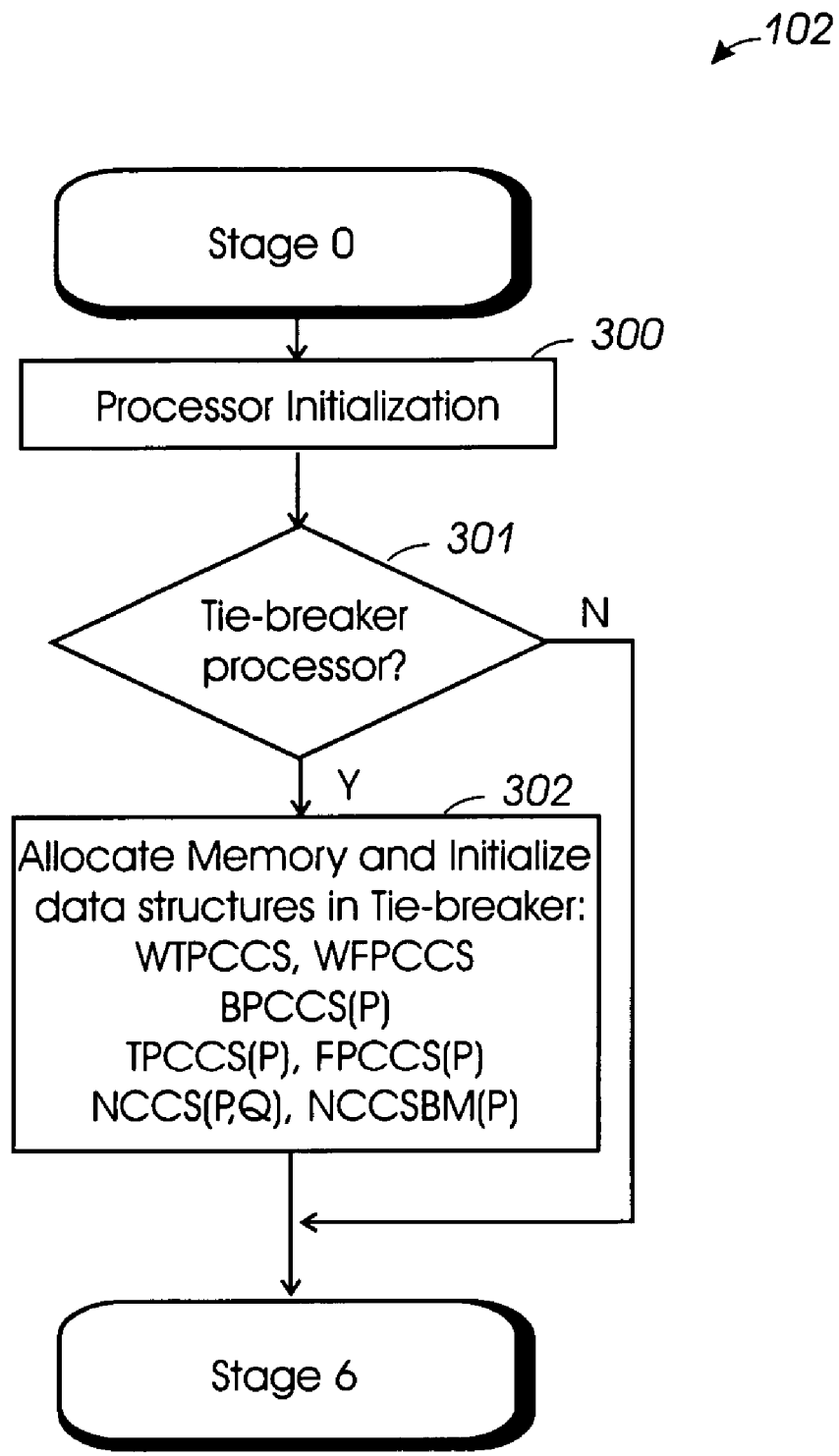
FIG. 3A shows a flow diagram of stages in an embodiment of a regroup process that can be utilized in the distributed processing system of FIG. 1.
Figure 3B:
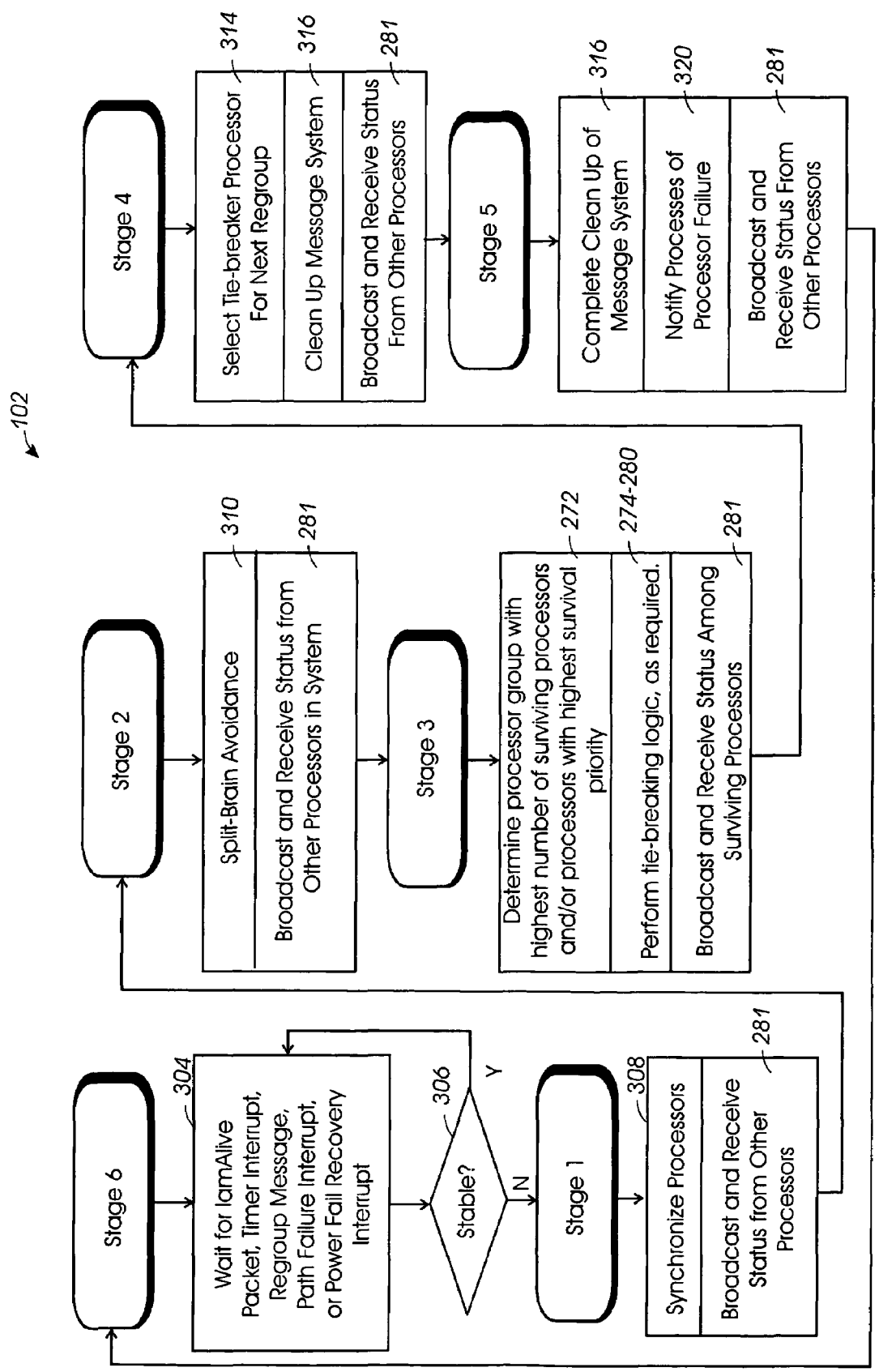
FIG. 3B shows a flow diagram of additional stages in an embodiment of a regroup process that can be utilized in the distributed processing system of FIG. 1.

Stages 1 through 5 together correspond to the perturbed state. Referring to FIGS. 1, 3A, and 3B, a flow diagram of functions that can be performed in some embodiments of regroup Stages 0 through 6 is shown in FIGS. 3A and 3B. A processor 106, 108 enters Stage 0 when it is cold loaded or reloaded. While in Stage 0, the processor 106, 108 does not participate in any regroup incidents, but can perform cold load or reload system initialization in process 300, as well as initialize data structures associated with background process 101. In system 100, processors can be initialized in one of two ways: cold load or reload. Normally, the first processor 106, 108 to be initialized in the system 100 undergoes initialization through a cold load. Cold load initialization implies that processor 106, 108 will load software, such as a copy of the operating system, from disk storage.

Once a first processor 106, 108 has been initialized, the remaining processors 106, 108 are normally initialized through a reload technique as opposed to a cold load technique. Reload is a technique whereby a previously initialized processor 106, 108 (referred to as the reloader processor) sends a copy of the software that needs to be loaded on a reloadee processor through the SAN fabric 110. The reload technique is usually much faster than a cold load, and it allows further optimizations such as the reloader processor reloading multiple reloadee processors in parallel. Such optimizations improve overall system availability by reducing the total amount of time required to initialize system 100.

If a processor 106 is designated to be tie-breaker processor 108, as determined in process 301, process 302 allocates memory for the additional data structures 282-290, as shown in FIG. 2F, if necessary, and initializes the value of the elements of regroup data structures 282-290. Any attempt to perturb a processor 106, 108 in Stage 0 can halt the processor. A processor 106, 108 does not transition from Stage 0 to Stage 6 until processor 106, 108 is ready to send and receive messages.

In the example shown, Stage 6 includes process 304 to detect IamAlive messages from other processors, timer interrupts, path failure interrupts, power failure recovery interrupts, and receipt of a regroup message from another processor. Process 306 determines whether processor 106, 108 is stable based on the detection of any events that could perturb processor 106, 108, or indicate that another processor 106, 108 is perturbed in process 304.

When processor 106, 108 becomes perturbed, regroup process 102 transitions to Stage 1. In process 308, the perturbed processors exchange a synchronization bit mask, for example, Knownstage 1 in the regroup message, indicating whether or not all processors 106, 108 have entered Stage 1. In some embodiments, each of the Knownstage bit masks records an identifier for each processor 106, 108 known to the maintaining processor 106, 108 to be participating in the regroup incident in the stage corresponding to the Knownstage variable. Sufficient time is provided to allow healthy processors 106, 108 to indicate whether they have entered Stage 1. For example, the amount of time allowed for Stage 1 is typically 2.4 seconds if all but one processor 106, 108 checked in. If two or more processors 106, 108 have not checked in, regroup process 102 will run in cautious mode and will typically allow additional time in Stage 1, such as 9.6 seconds for example. Finally, if the regroup incident was caused by a system power failure recovery, regroup process 102 can run in a power failure recovery cautious mode, and will typically allow a maximum time of 28.8 seconds for Stage 1. This generally provides enough time for all processors 106, 108 to power up and recover from the power outage. If a regroup message or any other message arrives from a processor 106, 108 that is not currently part of system 100, the receiving processor 106, 108 ignores the message and responds with a poison packet. Upon receiving the poison packet, the other processor 106, 108 unconditionally halts.

In process 308, each processor 106, 108 compares the regroup sequence number in the regroup messages from recognized processors 106, 108 in system 100 with the processor's own regroup sequence number. If the regroup sequence number in the regroup message is lower, then the sending processor 106, 108 is not participating in the current regroup incident. Other data in the regroup message is not current and can be ignored. The receiving processor 106, 108 sends a new regroup message to the transmitting processor 106, 108 to synchronize the transmitting processor 106, 108 to the current regroup incident.

If the regroup sequence number is higher than the processor's regroup sequence number, then a new regroup incident has started. The processor's regroup sequence number is set to the sequence number in the received regroup message. The processor 106, 108 reinitializes relevant regroup data structures and accepts the rest of the data in the regroup message.

If the regroup sequence number in the regroup message is the same as the processor's regroup sequence number, then the processor 106, 108 accepts the data in the regroup message. In some embodiments, the information in the incoming regroup message is merged with regroup information in the receiving processor 106, 108 so that the Knownstage 1 synchronization bit mask identifies valid processors 106, 108 with which to communicate during the current regroup incident. In later stages, the processor 106, 108 may accept regroup messages only from recognized processors 106, 108. The updated regroup message is then transmitted to other processors 106, 108 in system 100 in process 281. Regroup messages from other processors 106, 108 can also be received in process 281.

Stage 1 transitions to Stage 2 when (1) all processors 106, 108 account for themselves to the other processors 106, 108; or (2) the maximum allowed time for Stage 1 expires, whether all processors 106, 108 have accounted for themselves or not. In Stage 2, all processors 106, 108 build a new configuration for system 100 by adding processors 106, 108 that have been recognized by at least one of processors 106, 108 that is already included in system 100. For example, if processor A tells processor B that processor C is fully operative, then processor B recognizes processor C, even if processor B has not received a message from processor C directly. Malatose processors 106, 108 that may have been too slow to join the current regroup incident in Stage 1 can thus still join in Stage 2. Any processor 106, 108 that has not joined by the end of Stage 2 will be pruned from system 100.

Stage 2 can include split-brain avoidance process 310, for example as taught by U.S. Pat. No. 5,991,518, entitled "Method And Apparatus For Split-Brain Avoidance In A Multi-Processor System". Split-brain avoidance process 310 helps ensure that only one subgroup of processors 106, 108 survives regroup process 102 if failures partition system 100 into two or more disjoint subgroups of processors 106, 108.

Stage 2 can also include logic to broadcast status and receive status from other processors 106, 108, as indicated by process 281. For example, the regroup message can be broadcast to indicate the transmitting processor's status, as well as the processor's knowledge of the status of other processors, to all other processors 106, 108 in system 100.

Stage 3 includes pruning/tie-breaker process 104, such as processes 272 through 281, as shown and further discussed herein for FIG. 2E. Stage 3 removes processors 106, 108 with connectivity problems from system 100 to achieve full logical connectivity among the largest possible group of surviving processors 106, 108, and/or to achieve full logical connectivity among the largest possible group of surviving processors 106, 108 that includes processors 106, 108 with the highest survival priority. When more than one group of processors 106, 108 has the same highest number of surviving processors and/or processors with the highest survival priority, process 278 selects the group with the highest number of fully operative processors over groups with processors that have a history of connectivity problems. The results of pruning/tie-breaker process 104 are transmitted to other processors 106, 108 in system 100, as indicated by process 281 in Stage 3, before transitioning to Stage 4.

Stage 4 of regroup process 102 can include changing the processor designated as tie-breaker processor 108, as indicated by process 314, if the previous tie-breaker processor is no longer included in system 100. In some embodiments, the lowest numbered surviving processor 106 is selected to be tie-breaker processor 108, thereby allowing all other processors 106 in system 100 to easily determine which processor is designated as tie-breaker processor 108 using information in the regroup message, for example. Data structures 282-290 associated with the processor Connectivity Condition Scores that are kept by tie-breaker processor 108 can also be reset to zero, as required.

Stage 4 of regroup process 102 can also include process 316 to clean up the undelivered message transmissions from non-surviving processors. The message cleanup process 316 ensures that no message exchanges with a processor in the new configuration remain unresolved because of exclusion of the other processor from the new configuration.

Periodically broadcasting and receiving regroup messages continues in Stage 4, as indicated by process 281. When cleanup message system process 316 finishes cleaning up undelivered message transmissions from non-surviving processors, the processor 106, 108 records its status, for example, in the variable Knownstage 4 in the regroup message. Additionally, when the variable Knownstage 4 equals Knownstage 3, all processors 106, 108 in the new configuration have completed similar cleanup and are in Stage 4, and regroup process 102 transitions to Stage 5.

In Stage 5, processors 106, 108 complete cleanup message system process 316 by cleaning up undelivered message transmissions to non-surviving processors. After process 316 finishes, processors 106, 108 perform process 320 to notify application processes of the failure of one or more processors 106, 108. Delaying notification of processor failures until Stage 5 can prevent application processes being executed in processors 106, 108 from prematurely beginning activities that might produce incorrect results due to uncanceled message exchanges with the failed processor(s). Each surviving processor 106, 108 can set processor status variables to indicate their knowledge of excluded processors in the down state.

When cleanup process 316 that was initiated earlier in Stage 4 finishes, the processor records its status, for example, in the variable Knownstage 5 in the regroup message. Additionally, when the variable Knownstage 5 equals Knownstage 4, all processors in the new configuration have completed similar cleanup and are in Stage 5. Process 281 broadcasts and receives regroup messages and regroup process 102 then transitions to Stage 6.

Logic instructions and data structures associated with processes and processes disclosed herein can be stored on a computer readable medium, or accessed in the form of electronic signals. The logic modules, processing systems, and components described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components are disclosed herein as separate and discrete components. These components may, however, be combined to form larger or different software modules, logic modules, integrated circuits, or electrical assemblies, if desired.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. In the claims, unless otherwise indicated the article "a" is to refer to "one or more than one".

We claim:

1. A system for fault-tolerant processing, comprising:
   a processor unit;
   computer instructions stored on a computer readable medium and operable to:
      detect at least one of: failure of other processor units in the system, and connectivity failures that disrupt communications between the processor units;
      evaluate connectivity condition scores (CCSs) for the processor units, wherein the processor units are operable to communicate with each other via at least two communication paths, and the CCSs are based on weighted sums of connectivity errors experienced on the communication paths during an observation period;
      determine at least two candidate groups with the same number of at least a portion of the processor units to include in the system; and
      select between the at least two candidate groups based on the CCSs.

2. The system of claim 1, wherein the processor units in each candidate group are capable of communicating with the other processor units in the candidate group.

3. The system of claim 1, wherein the severity of each connectivity error is factored into a corresponding CCS.

4. The system of claim 1, wherein at least one of the CCSs is based on the history of connectivity errors on the corresponding communication path, and a decay factor is used to define how fast historic CCSs are decayed over an observation period.

5. The system of claim 1, further comprising:
   computer instructions stored on a computer readable medium and operable to:
      unpack a bit mask of normalized CCSs from each processor unit.

6. The system of claim 1, further comprising:
   computer instructions stored on a computer readable medium and operable to:
      form a bi-directional CCS for each processor unit based on normalized CCSs; and
      select between the two candidate groups to include in the system based on the bi-directional CCSs for the processor units in each candidate group.

7. A system for fault-tolerant processing, comprising:
   a processor unit configurable to communicate with other components in the system via at least two switching fabrics; and computer instructions stored on a computer readable medium and operable to:
      maintain a connectivity condition score (CCS) for each communication path along the at least two fabrics based on connectivity errors experienced on the path, wherein the number of connectivity errors during previous observation time periods are factored into a corresponding CCS during an observation time period, the CCSs are based on weighted sums of connectivity errors experienced on the communication paths during an observation period, and the CCSs are utilized to determine whether the processor unit will continue to be included in the system.

8. The system of claim 7, wherein the severity of each connectivity error is factored into the corresponding CCS.

9. The system of claim 7, wherein the processor unit is further configured to communicate the CCSs to at least one of the other components in the system.

10. The system of claim 7, further comprising:
    computer instructions stored on a computer readable medium and operable to: summarize each set of CCSs into a single score.

11. The system of claim 10, further comprising:
    computer instructions stored on a computer readable medium and operable to: normalize each set of CCSs based on the single score.

12. The system of claim 7, further comprising:
    computer instructions stored on a computer readable medium and operable to: transform normalized CCSs into a condensed format.

13. A computer product, comprising:
    data structures stored on a computer readable medium including:
       a connectivity condition score (CCS) for each communication path associated with a processor unit in a distributed processing system, wherein the CCS indicates the connectivity condition of the communication path during at least one observation period; and
       a connectivity matrix indicating whether the processor unit is able to communicate with other components in the system through any of the communication paths; and
       a single score representing the sum of the CCSs for the processor unit.

14. The computer product of claim 13, wherein each CCS is normalized and stored in a bit mask.

15. A method for regrouping processor units in a fault-tolerant system, comprising:

determining the ability of each processor unit to communicate with other processor units in the system;

forming at least two candidate groups with the same number of processor units that are able to communicate with each other;

generating a single score representing a sum of connectivity condition scores (CCSs) for the processor units in the at least two candidate groups, wherein the CCS indicates the connectivity condition of one communication path associated with a corresponding processor unit; and evaluating the single score for each candidate group of the processor units.

16. The method of claim 15, wherein the CCS is based on the number of connectivity errors experienced by the corresponding communication path.

17. The method of claim 15, wherein at least one of the CCSs is based on historical connectivity errors experienced by the corresponding communication path.

18. The method of claim 16, wherein the severity of each connectivity error is factored into the corresponding CCS.

19. The method of claim 16, further comprising:
forming a bi-directional CCS for each processor unit; and
selecting between the at least two candidate groups to include in the system based on the sum of the bi-directional CCSs for the processor units in each group.

20. The method of claim 19, further comprising:
selecting an arbitrary one of the at least two candidate groups when the candidate groups have the same sum of bi-directional CCSs.

21. An apparatus for regrouping processor units in a fault-tolerant system, comprising:

means for forming at least two candidate groups of processor units that are able to communicate with each other; and means for evaluating connectivity condition scores (CCSs) for each candidate group of the processor units, wherein the number of connectivity errors during previous observation time periods are factored into a corresponding CCS during an observation time period and each CCS indicates the severity of connectivity errors experienced by one communication path associated with a corresponding processor unit; and means for selecting an arbitrary one of the at least two candidate groups when the candidate groups have the same sum of CCSs.

22. The apparatus of claim 21, further comprising means for counting the number of connectivity errors experienced by a corresponding communication path during an observation period.

23. The apparatus of claim 21, further comprising means for factoring into the CCS connectivity errors experienced by a corresponding communication path during at least one previous observation period.

24. The apparatus of claim 21, further comprising means for selecting a candidate group based on survival priority of the processor units included in each candidate group.

25. The apparatus of claim 24, further comprising means for selecting a candidate group based on the CCSs, when both candidate groups have the highest number of at least one of the group consisting of: processor units and processor units with the highest survival priority.

* * * * *

UNITED STATES PATENT AND TRADEMARK OFFICE
CERTIFICATE OF CORRECTION

PATENT NO. : 7,231,543 B2
APPLICATION NO. : 10/758570
DATED : June 12, 2007
INVENTOR(S) : Man-Ho Lawrence Lee et al.

It is certified that error appears in the above-identified patent and that said Letters Patent is hereby corrected as shown below:

In column 11, line 12, delete "processors)" and insert -- processor(j) --, therefor.

Signed and Sealed this

Nineteenth Day of August, 2008

JON W. DUDAS
*Director of the United States Patent and Trademark Office*